(12) United States Patent
Li et al.

(10) Patent No.: US 9,409,667 B2
(45) Date of Patent: Aug. 9, 2016

(54) UNLOADING MECHANISM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bing Li, Shenzen (CN); Bo Yang, Shenzen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/540,101

(22) Filed: Nov. 13, 2014

(65) Prior Publication Data

US 2015/0129139 A1 May 14, 2015

(30) Foreign Application Priority Data

Nov. 13, 2013 (CN) .......................... 2013 1 0569689

(51) Int. Cl.
   *B32B 38/10* (2006.01)
   *B65B 69/00* (2006.01)
   *B32B 43/00* (2006.01)

(52) U.S. Cl.
   CPC ............. *B65B 69/00* (2013.01); *B65B 69/0058* (2013.01); *B32B 38/10* (2013.01); *B32B 43/006* (2013.01); *Y10T 156/1132* (2015.01); *Y10T 156/1179* (2015.01); *Y10T 156/1983* (2015.01); *Y10T 156/1994* (2015.01)

(58) Field of Classification Search
   CPC   B32B 38/10; B32B 43/006; Y10T 156/1132; Y10T 156/1179; Y10T 156/1944; Y10T 156/1983
   USPC .................................. 156/707, 716, 758, 765
   See application file for complete search history.

(56) References Cited

U.S. PATENT DOCUMENTS

| 4,990,051 | A  | * | 2/1991 | Safabakhsh | ....... | H01L 21/67132 156/707 |
| 6,173,750 | B1 | * | 1/2001 | Davis | ................ | H01L 21/67144 156/707 |

(Continued)

FOREIGN PATENT DOCUMENTS

| TW | I268532 | 12/2006 |
| TW | M420824 U1 | 1/2012 |
| TW | I406752 B1 | 9/2013 |

*Primary Examiner* — Mark A Osele
*Assistant Examiner* — Nickolas Harm
(74) *Attorney, Agent, or Firm* — ScienBiziP, P.C.

(57) ABSTRACT

A unloading mechanism for removing workpieces from a transporting film can include a loading assembly and a unloading assembly coupled to the loading assembly. The loading assembly can include a base, a first driving member and an absorbent member. The base can include a base body, a first guiding member slidably extending through the base body, and a plurality of pushing members coupled to the base body. The first driving member can be coupled to the base body. The absorbent member can be coupled to the first guiding member. The absorbent member can define a plurality of receiving holes, and the pushing members can be received in the receiving holes. The unloading assembly can include a second driving member coupled to the first driving member, and a stopping member coupled to the second driving member adjacent to the absorbent member.

20 Claims, 4 Drawing Sheets

(56) References Cited

U.S. PATENT DOCUMENTS

| | | | | |
|---|---|---|---|---|
| 6,505,395 B1 * | 1/2003 | Farnworth | ............ | B25B 11/005 156/750 |
| 6,629,553 B2 * | 10/2003 | Odashima | ......... | H01L 21/67144 156/716 |
| 6,896,762 B2 * | 5/2005 | Huang | ............. | H01L 21/67132 156/707 |
| 7,303,647 B2 * | 12/2007 | Cheung | ............ | H01L 21/67132 156/716 |
| 7,665,204 B2 * | 2/2010 | Cheung | ............ | H01L 21/67132 156/716 |
| 7,824,932 B2 * | 11/2010 | Kobashi | ............ | H01L 21/67132 257/E21.525 |
| 8,221,583 B2 * | 7/2012 | Min | .................. | H01L 21/67011 156/707 |
| 8,262,146 B2 * | 9/2012 | Stoppel | ............ | H01L 21/67132 29/743 |
| 2013/0048222 A1 * | 2/2013 | Tanaka | ............ | H01L 21/67092 156/707 |

* cited by examiner

UNLOADING MECHANISM

FIELD

The subject matter herein generally relates to unloading mechanisms, and particularly relates to an unloading mechanism applied to workpieces pasted on a transporting film.

BACKGROUND

In order to conveniently transport minimize workpiece, a plurality of minimize workpieces can be pasted on a transporting film. Before being machined, the workpieces should be removed from the transporting film and positioned into a fixture. An unloading mechanism can be used when removing and positioning.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
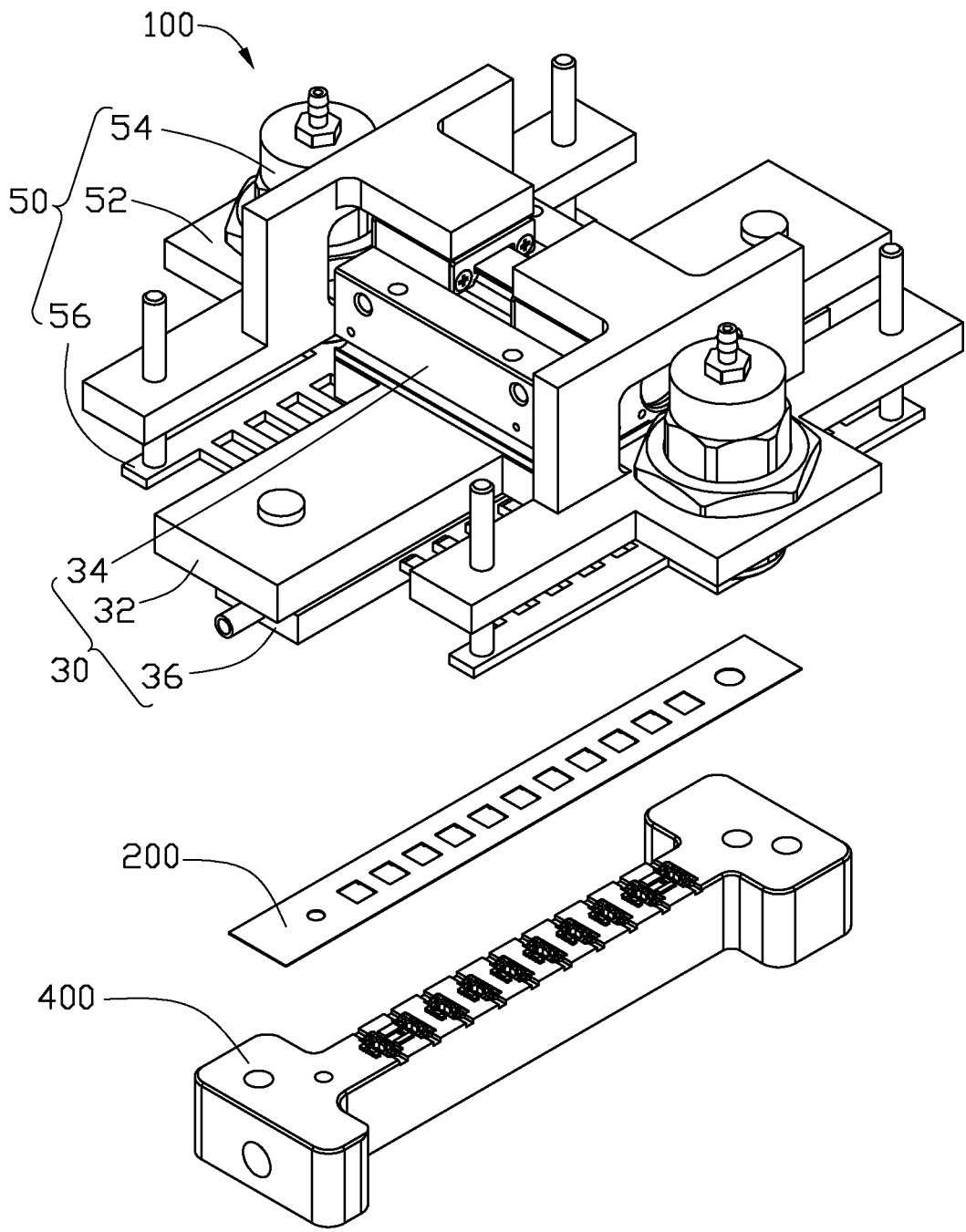
FIG. 1 is a partially exploded, isometric view of an embodiment of a unloading mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to unloading mechanisms, and particularly relates to an unloading mechanism applied to workpieces arranged on a transporting film.

An unloading mechanism for removing workpieces from a transporting film can include a loading assembly and an unloading assembly coupled to the loading assembly. The loading assembly can include a base, a first driving member and an absorbent member. The base can include a base body, a first guiding member slidably extending through the base body, and a plurality of pushing members coupled to the base body. The first driving member can be coupled to the base body. The absorbent member can be coupled to the first guiding member. The absorbent member can define a plurality of receiving holes, and the pushing members can be received in the receiving holes. The unloading assembly can include a second driving member coupled to the first driving member, and a stopping member coupled to the second driving member adjacent to the absorbent member. The absorbent member can be configured to suck up the transporting film with workpieces pasted thereon. The first driving member can be configured to move the stopping member to a side of the transporting film. The second driving member can be configured to move the stopping member to press the transporting film, and push the stopping member close to the base body. Thereby the pushing members can be configured to protrude out of the absorbent member and push the workpieces away from the transporting film.

Figure 2:
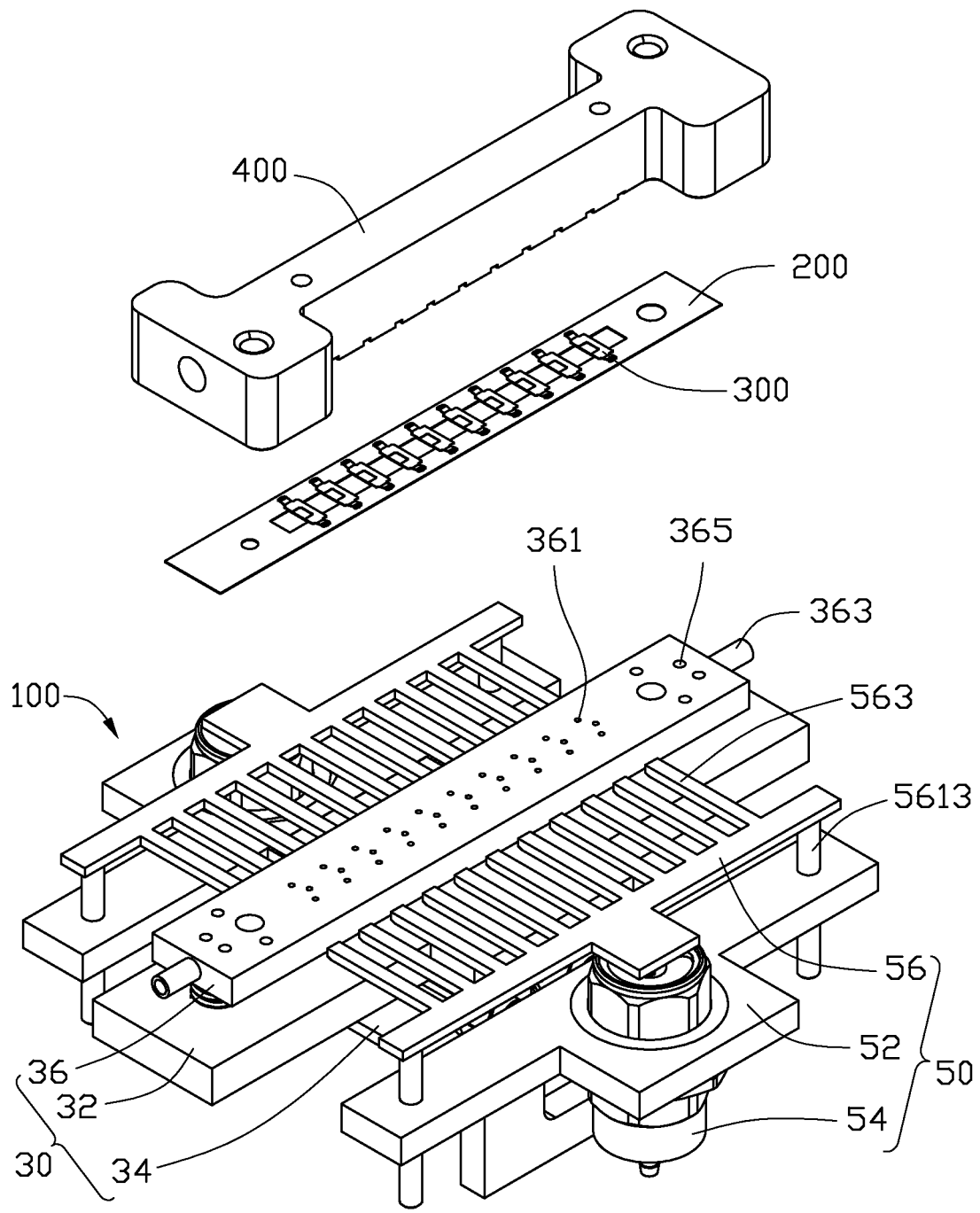
FIG. 2 is similar to FIG. 1, but viewed from another angle.

FIGS. 1-2 illustrate an embodiment of an unloading mechanism 100 configured to cooperate with an external mechanism arm (not shown) to remove workpieces 300 pasted on a transporting film 200, and to position the workpieces 300 into a fixture 400 in order. In the illustrated embodiment, the workpiece 300 can be a minimize slice. A plurality of workpieces 300 can be pasted on a transporting film 200 spaced from each other. The unloading mechanism 100 can include a loading assembly 30 and two unloading assemblies 50 coupled to the loading assembly 30.

Figure 3:
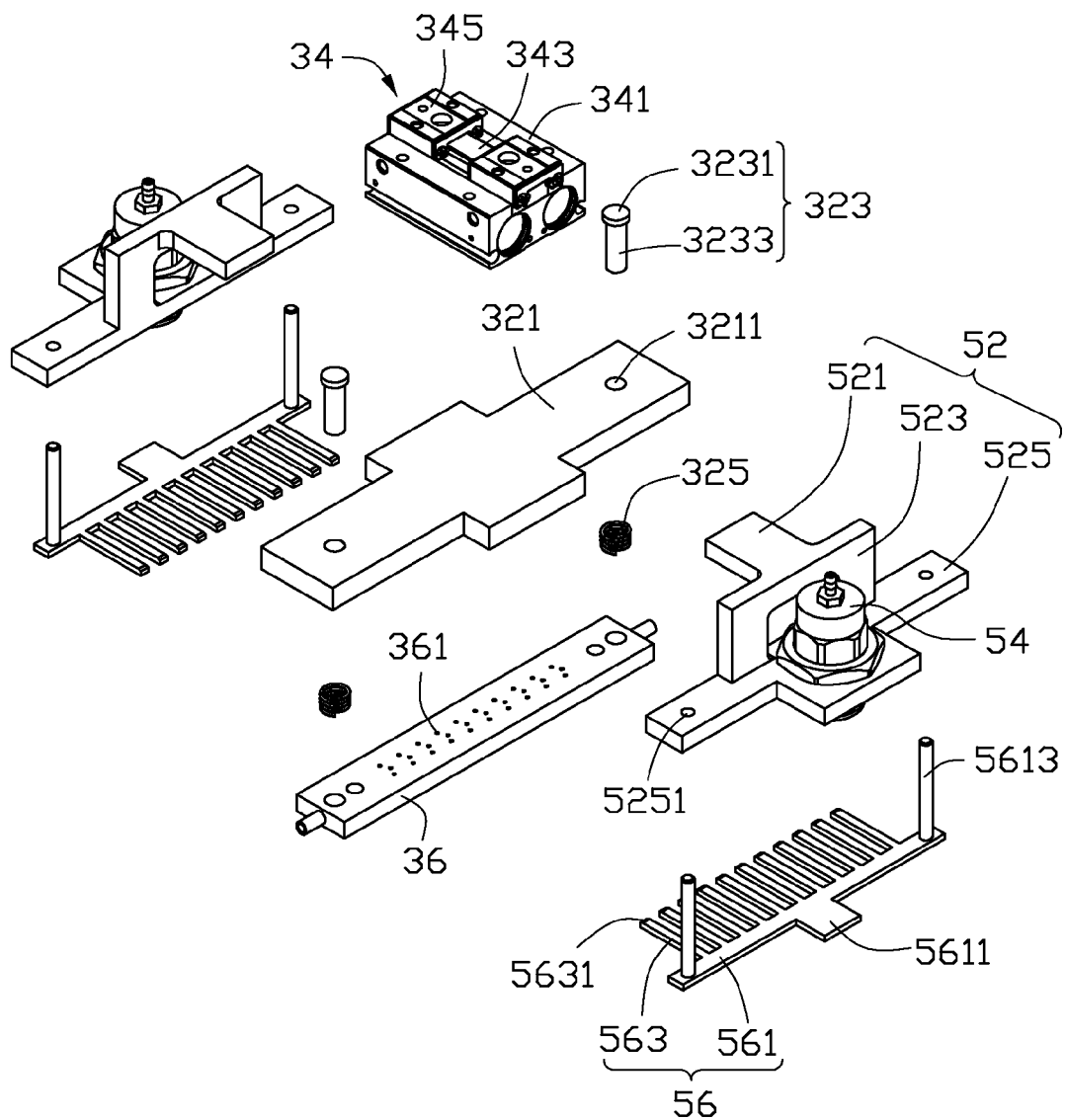
FIG. 3 is an exploded, isometric view of the unloading mechanism of FIG. 1.

Referring to FIGS. 1 and 3, the loading assembly 30 can include a base 32, a first driving member 34 coupled to the base 32, and an absorbent member 36 coupled to the base 32. In the embodiment, the first driving member 34 and the absorbent member 36 can be positioned at opposite sides of the base 32, respectively.

Figure 4:
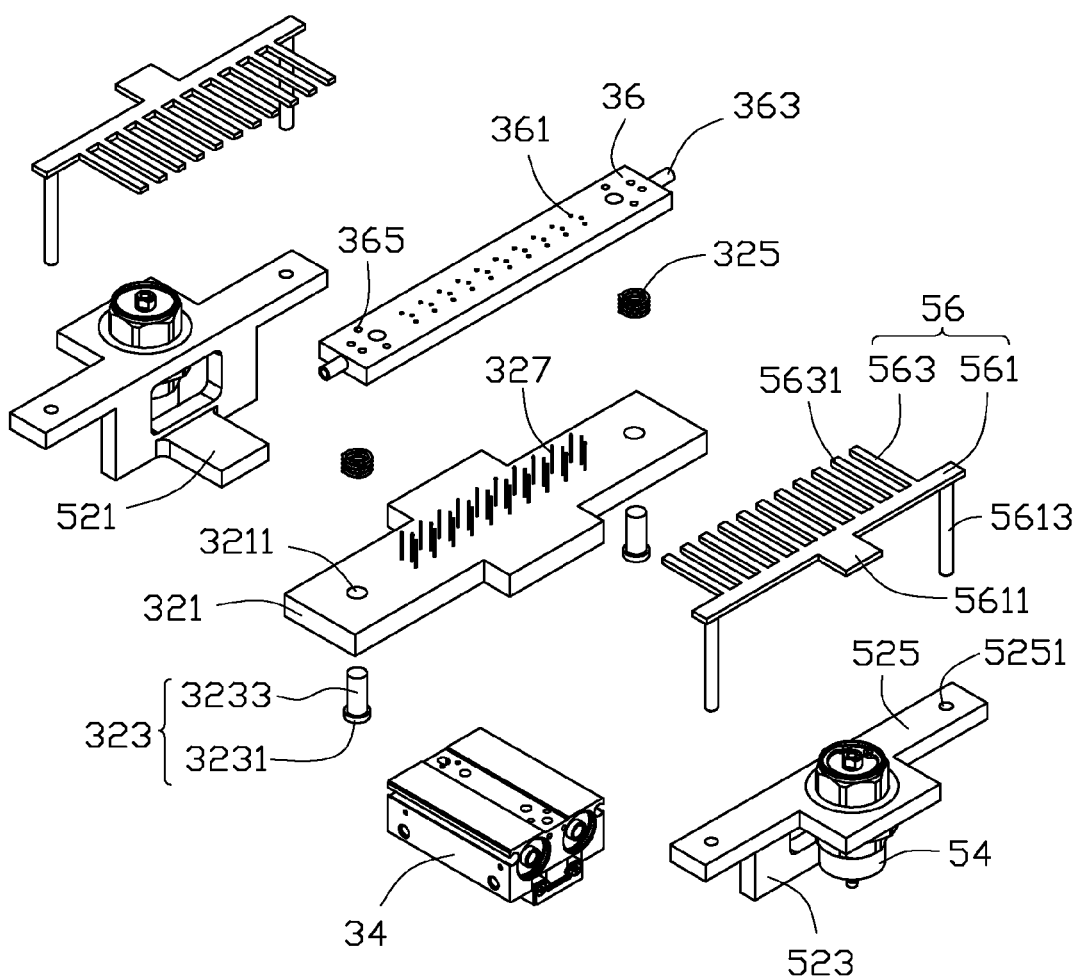
FIG. 4 is similar to FIG. 3, but viewed from another angle.

Referring to FIG. 4, the base 32 can include a base body 321, two first guiding members 323 coupled to the base body 321, two elastic members 325 coupled to the first guiding members 323 respectively, and a plurality of pushing members 327 coupled to the base body 321. In the illustrated embodiment, the pushing members 327 can be positioned on the base body 321 and extend through the absorbent member 36.

The base body 321 can be substantially a rectangular plate, and define two first guiding holes 3211 thereon. The two first guiding holes 3211 can be positioned on opposite ends of the base body 321, respectively. Each of the first guiding members 323 can be positioned in a corresponding first guiding hole 3211. Each of the first guiding members 323 can include a guiding portion 3233 and a flange 3231 forming on an end of the guiding portion 3233. The guiding portion 3233 can be slidably inserted through the first guiding hole 3211, and can be exposed from a side of the base body 321. The flange 3231 can resist against the other side of the base body 321. Each of the elastic members 325 can be sleeved on the corresponding guiding portion 3233. An end of the elastic member 325 can resist against the base body 321. The plurality of the pushing members 327 can be positioned on a surface of the base body 321 away from the first driving member 34, and spaced from each other. The pushing members 327 can be configured to pierce the transporting film 200 and push the workpieces 300 away from the transporting film 200.

In the illustrated embodiment, the pushing member 327 can be substantially acircular. Every three of the pushing members 327 can be separated from others and can cooperatively define a pushing assembly. Each of the pushing assemblies can correspond to one workpiece 300. Three pushing members 327 in a pushing assembly can be positioned in a triangular arrangement. In an alternative embodiment, the three pushing members 327 in a pushing assembly can be positioned in other types, such as, but not limited to, the three pushing members 327 can be positioned in a straight line, or in a circular line. In an alternative embodiment, each pushing assembly can include four or more than four pushing members 327.

The first driving member 34 can be positioned at a side of the base body 321 away from the pushing members 327. The first driving member 34 can include a driving body 341, a guiding rail 343 coupled to the driving body 341, and two driving portions 345 coupled to the guiding rail 343. The driving body 341 can be mounted to the base body 321. The guiding rail 343 can be positioned at a side of the driving body 341 away from the base body 321, and parallel to the base body 321. In the illustrated embodiment, the driving body 341 can be a cylinder. The driving portions 345 can be positioned at opposite ends of the guiding rail 323 respectively. The driving body 341 can be configured to drive the driving portions 345 to move close to or away from each other.

The absorbent member 36 can be substantially a rectangular plate, and can be parallel to the base body 321. Opposite ends of the absorbent member 36 can be coupled to the two guiding portions 3233 respectively. Such that the elastic member 325 can resist between the base body 321 and the absorbent member 36. The absorbing member 36 can define a plurality of receiving holes 361 corresponding to the plurality of pushing members 327. Each of the receiving holes 361 can correspond to a pushing member 327. The absorbent member 36 can provide two joints 363 respectively at opposite ends thereof, and can further define two groups of air inlets 365 thereon, respectively corresponding to the joints 363. The joints 363 can be configured to communicate with an external air resource (not shown). The air inlets 365 can be positioned at a side of the absorbent member 36 away from the base body 321. The air inlets 365 can communicate with the external air resource via the corresponding joints 363. Such that can external air resource can suck the air, enabling the absorbent member 36 to suck up the transporting film 200 with the plurality of workpieces 300 thereon, via the air inlets 365.

The unloading assemblies 50 can be respectively mounted to the driving portions 345. Each of the unloading assemblies 50 can include a supporting member 52, a second driving member 54 coupled to the supporting member 52, and a stopping member 56 coupled to the second driving member 54.

The supporting member 52 can include a mounting portion 521, a connecting member 523, and a supporting portion 525. The mounting portion 521 can be substantially a plate. An end of the mounting portion 521 can be fixed to the corresponding driving portion 345. The connecting portion 523 can be formed at an end of the mounting portion 521 away from the driving portion 345, and can extend towards the absorbent member 36 perpendicularly. The supporting portion 525 can be substantially a plate, and can be perpendicularly mounted to an end of the connecting portion 523 away from the mounting portion 521. The driving portion 345 can be configured to drive the supporting member 52 to move along a direction parallel to the base body 321.

The second driving member 54 can be mounted on the middle of the supporting portion 525. In the illustrated embodiment, the second driving member 54 can be a cylinder.

The stopping member 56 can be coupled to the second driving member 54, and positioned at a side of the supporting portion 525 away from the connecting portion 523. The second driving member 54 can be configured to drive the stopping member 56 to move along a direction perpendicular to the base body 321. The stopping member 56 can include a basing portion 561 and a plurality of stopping portions 563 forming on the basing portion 561.

The basing portion 561 can be substantially a strip, and can provide a protruding end 5611 thereon. The protruding portion 5611 can protrude from the middle of the basing portion 561, and can be coupled to the second driving member 54. The basing portion 563 can provide two second guiding members 5613 thereon. The two second guiding members 5613 can be positioned at opposite end of the basing member 563, and can extend towards the supporting portion 525. Each of the second guiding members 5613 can be received in a corresponding second guiding hole 5251. The second guiding member 5613 can be substantially perpendicular to the protruding end 5611, and configured to guide the moving direction of the stopping member 56 relative to the supporting portion 525.

The stopping portions 563 can be formed at a side of the basing portion 561 away from the protruding portion 5611, and can extend towards the absorbent member 36 a long a direction parallel to the absorbent member 36. In the illustrated embodiment, the stopping portions 563 can be substantially strip and spaced from each other. Each of the stopping portions 563 can provide a stopping end 5631 at an end thereof, away from the basing portion 561. Stopping ends 5631 of one of the unloading assemblies 50 can be opposite to that of the other of the unloading assemblies 50. The stopping ends 5631 can be configured to resist against the transporting film 300 with the workpieces 300 thereon, such that the transporting film 30 can be firmly adhered on the absorbent member 36 when the pushing members 327 pierce the transporting film 30 to push the workpieces 300 away from the transporting film 200.

In assembly, the first guiding member 323 and the pushing members 327 can be positioned on the base body 321. The elastic members 325 can be sleeved on the corresponding guiding portions 3233. The absorbent member 36 can be mounted to an end of the guiding portions 3233. The first driving member 34 can be mounted to the base body 321. The second driving member 54 can be coupled to the supporting portion 525. The stopping member 56 can be coupled to the second driving member 54, enabling the second guiding member 5613 to slidably insert through the second guiding hole 5251. The supporting member 52 can be mounted to the driving portion 345. The joints 363 can be communicated with the external air resource.

In operation, the unloading mechanism 100 can mounted to an external mechanical arm (not shown), the mechanical arm can move the unloading mechanism 100 close to the transporting film 200 with workpieces 300 thereon. The absorbent member 36 can be stacked on a surface of the transporting film 200 away from the workpieces 300, and can suck up the transporting film 200 and the workpieces 300. Each of the workpieces 300 can correspond to a pushing assembly. The mechanical arm can move the unloading mechanism 100 to the fixture 400, and the transporting film 200 can be positioned over the fixture 400. The first driving member 34 can drive the supporting members 52 to move the two stopping portions 563 close to each other, the stopping ends 5631 can be positioned parallel to the transporting film 200. The second driving members 54 can drive the stopping members 56 to move closing to the absorbent member 36, enabling the stopping ends 5631 to press opposite sides of the transporting film 200. The second driving members 54 can keep moving the stopping members 56. The stopping members 56 can resist against and push the absorbent member 36 to move close to the base body 321, and the elastic members 325 can be pressed. Such that the pushing members 327 received in the receiving holes 361 can protrude out of the absorbent member 36, to pierce the transporting film 200 and resist against the workpieces 300. The second driving member 54 can keep driving the stopping portions 561 to move a certain distance, the workpieces 300 can be removed from the transporting film 200 when pushed by the pushing members 327.

In an alternative embodiment, there can be only one unloading assembly 50. Such that the stopping ends 5631 can resist against the transporting film 200 with workpieces 300 thereon, enabling the transporting film 200 to be firmly adhered on the absorbent member 36 while the workpieces 300 is pushed to separate from the transporting film 200.

In an alternative embodiment, the supporting members 52 can be omitted. Such that the second driving members 54 can be mounted to the driving portions 345, and the first driving member 34 can drive the two second driving members 54 to move close to or away from each other.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. An unloading mechanism for removing workpieces from a transporting film, the unloading mechanism comprising:
    a loading assembly comprising:
        a base comprising:
            a base body;
            a first guiding member slidably extending through the base body; and
            a plurality of pushing members coupled to the base body; and
        a first driving member coupled to the base body; and
        an absorbent member coupled to the first guiding member, the absorbent member defining a plurality of receiving holes, the pushing members received in the receiving holes; and
    an unloading assembly comprising:
        a second driving member coupled to the first driving member; and
        a stopping member coupled to the second driving member and adjacent to the absorbent member;
    wherein the absorbent member is configured to suck up the transporting film with workpieces thereon;
    the first driving member is configured to move the stopping member to a side of the transporting film; and
    the second driving member is configured to move the stopping member to press the transporting film, and push the stopping member close to the base body, thereby the pushing members are configured to protrude out of the absorbent member and push the workpieces away from the transporting film.

2. The unloading mechanism of claim 1, wherein the absorbent member further defines air inlets thereon configured to communicate with an external air resource.

3. The unloading mechanism of claim 1, wherein the pushing member is acicular, every three of the pushing members are separated from others and cooperatively define a pushing assembly to resist against a corresponding workpiece, and the three of the pushing members are positioned in a triangular arrangement.

4. The unloading mechanism of claim 1, wherein the base body defines a first guiding hole thereon, the first guiding member comprises a guiding portion configured to extend through the first guiding hole and coupled to the absorbent member.

5. The unloading mechanism of claim 4, wherein the first guiding member further comprises a flange formed on the guiding portion, the flange resists against a side of the base body away from the absorbent member.

6. The unloading mechanism of claim 1, wherein the first driving member comprises a driving body coupled to the base body, a guiding rail coupled to the driving body, and a driving portion positioned on the guiding rail, the second driving member is coupled to the driving portion.

7. The unloading mechanism of claim 1, wherein the unloading assembly further comprises a supporting member comprising a mounting portion coupled to the first driving member, a connecting member formed on the mounting portion and extending towards the absorbent member, and a supporting portion formed at an end of the connecting portion away from the mounting portion; the second driving member is coupled to the supporting member, the first driving member is configured to drive the supporting member to move the second driving member.

8. The unloading mechanism of claim 7, wherein the stopping member comprises a basing portion, a protruding end formed on a side of the basing portion, and a stopping portion formed on the opposite side of the basing portion; the protruding portion is coupled to the second driving member, the stopping portion extends towards the absorbing member.

9. The unloading mechanism of claim 8, wherein the unloading assembly further comprises a second guiding member coupled to the basing portion, the supporting portion defines a second guiding hole corresponding to the second guiding member, the second guiding member slidably extends through the second guiding hole.

10. The unloading mechanism of claim 1, wherein the loading assembly further comprises an elastic member sleeved on the first guiding member, an end of the elastic member resists against the base body, the other end of the elastic member resists against the absorbent member.

11. An unloading mechanism comprising:
    a loading assembly comprising:
        a base comprising:
            a base body;
            a first guiding member slidably extending through the base body; and
            a plurality of pushing members coupled to the base body; and
        a first driving member coupled to the base body; and
        an absorbent member coupled to the first guiding member; the absorbent member defining a plurality of receiving holes, the pushing members received in the receiving holes; and
    an unloading assembly comprising:
        a second driving member coupled to the first driving member; and a stopping member coupled to the second driving member and adjacent to the absorbent member.

12. The unloading mechanism of claim 11, wherein the absorbent member further defines air inlets thereon configured to communicate with an external air resource.

13. The unloading mechanism of claim 11, wherein each of the pushing members is acicular, every three of the pushing members are separated from others and define a pushing assembly, the three pushing members are positioned in a triangular arrangement.

14. The unloading mechanism of claim 11, wherein the base body defines a first guiding hole thereon, the first guiding member comprises a guiding portion configured to extend through the first guiding hole and coupled to the absorbent member.

15. The unloading mechanism of claim 14, wherein the first guiding member further comprises a flange formed on the guiding portion, the flange is resist against a side of the base body away from the absorbent member.

16. The unloading mechanism of claim 11, wherein the first driving member comprises a driving body coupled to the base body, a guiding rail coupled to the driving body, and a driving portion positioned on the guiding rail, the second driving member is coupled to the driving portion.

17. The unloading mechanism of claim 11, wherein the unloading assembly further comprises a supporting member comprising a mounting portion coupled to the first driving member, a connecting member formed on the mounting portion and extending towards the absorbent member, and a supporting portion forming at an end of the connecting portion away from the mounting portion; the second driving member is coupled to the supporting member.

18. The unloading mechanism of claim 17, wherein the stopping member comprises a basing portion, a protruding end forming on a side of the basing portion, and a stopping portion formed on the opposite side of the basing portion; the protruding portion is coupled to the second driving member, the stopping portion extends towards the absorbing member.

19. The unloading mechanism of claim 18, wherein the unloading assembly further comprises a second guiding member coupled to the basing portion, the supporting portion defines a second guiding hole corresponding to the second guiding member, the second guiding member slidably extends through the second guiding hole.

20. An unloading mechanism comprising:
a loading assembly comprising:
  a base comprising:
    a base body;
    a first guiding member slidably extending through the base body; and
    a plurality of pushing members coupled to the base body; and
  a first driving member coupled to the base body; and
  an absorbent member coupled to the first guiding member; the absorbent member defining a plurality of receiving holes, the receiving holes configured to receive the pushing members; and
an unloading assembly comprising:
  a second driving member coupled to the first driving member; and
  a stopping member coupled to the second driving member and adjacent to the absorbent member.

* * * * *